Figure 1:
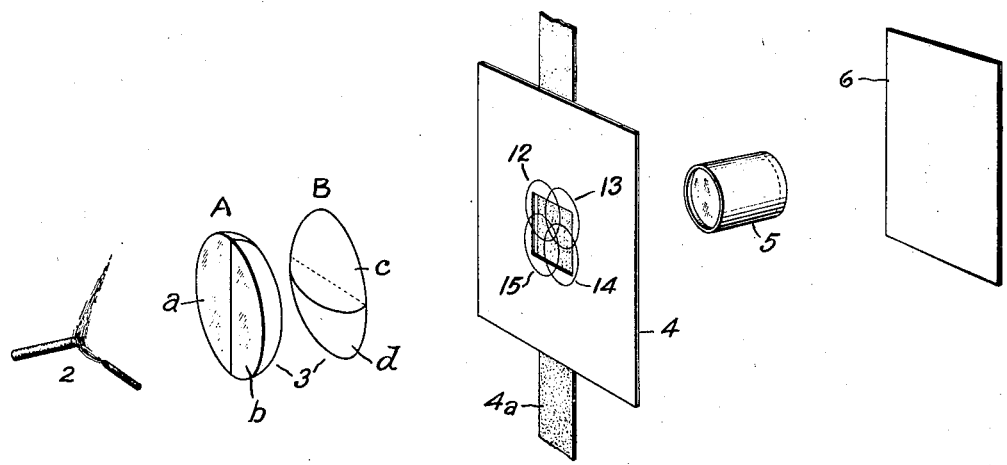

June 11, 1929.          F. A. BENFORD          1,716,756
LIGHT PROJECTION SYSTEM
Original Filed Aug. 24, 1923    2 Sheets—Sheet 1

Inventor:
Frank A. Benford,
by *(signature)*
His Attorney.

Inventor:
Frank A. Benford,
by Alexander F. Smith.
His Attorney.

Patented June 11, 1929.

1,716,756

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

LIGHT-PROJECTION SYSTEM.

Application filed August 24, 1923, Serial No. 659,226. Renewed November 1, 1928.

My invention relates to lenses. More particularly, it relates to lenses which are adapted for use in connection with motion picture machines, spotlights, and the like.

In the problem of lens construction in addition to projecting the maximum amount of light through the aperture and film there comes in the problem of avoiding the formation of images at or near the film. If this is not prevented the projection lens projects this image to the screen with the result that streaks of high and low brightness, color and other defects of illumination make their appearance on the screen. The illumination of the screen is in effect but the duplication of the illumination of the film on a lower scale of intensity. This problem of preventing the formation of images is aggravated when high intensity sources of light such as the Beck arc or the 900 watt Mazda lamp are used. One of the objects of my invention is to produce a condensing lens which will avoid this undesirable effect. Therefore, my invention is in the nature of an improvement upon my application for United States Letters Patent Serial No. 595,185. In the design of condensing lenses for use in connection with devices of the above character, we are therefore dealing with two opposing characteristics, namely, high projection efficiency which means a tendency to produce images at the aperture and film, a smoothness and uniformity of screen illumination which means freedom from images at the aperture place or film. This means that provision of means for neutralizing at the aperture place of tendency toward image formation. In some of the lenses of the prior art this problem is approached by throwing the image out of focus with respect to the aperture plate. The objection to this method of solving the problem is that it is attended with a considerable loss of light. In my prior application Serial No. 595,185 I point out that the image forming tendency may be greatly lessened by removing the central section of the condensing lens along a plane passing through the axis of projection. The thickness of the section removed, in the case where a 900 watt Mazda lamp is used is equal to half the spacing of the filament coils used in such a lamp. I further point out that the cut area of the lens is now polished and the two plane faces brought together with a dividing line, in general, parallel to the direction of the filament coils. The optical axes of the two sections of the lens now no longer coincide but are separated and run parallel to each other and to the optical axis of the system at a distance of half the space of the filament coils. As a result each part forms a separate and distinct set of images at the aperture plate and therefore upon the screen. Of necessity, these images now overlap by half the coil spacing so that the images of the coils produced by one half of the lens fall upon the dark spaces between the coils produced by the other half of the lens. In this manner, the dark spaces are reduced and there is a vary marked improvement in the smoothness of the screen illumination without sacrificing light. Such a condensing lens may be set in position of maximum projecting efficiency, thereby securing as close an approach to full theoretical efficiency as the limitation of the design and material permit. When the high intensity arc is used, the result with a single split lens is not quite as satisfactory as when the high intensity Mazda lamp is used, for the reason that the arc is a unit and does not produce dark and light streaks, but it does vary in brightness between center and edge, and the overlapping of images should be done in a different manner. The arc has a very bright center with much less intense edges, the difference in intensity being possibly as great as 6 to 1. With the usual equipment, when the arc is used, the image is thrown out of focus so as to diminish the intensity of the light in the center of the screen and build up the less intense edges, but this method is very wasteful of light. When the lens is split in two, as in my prior application, two images of the arc crater are produced, one on the right of the center and one on the left. This improves the distribution, but general uniform illumination is not produced even with this construction. One of the objects of my present invention is to further split the second of the two condensing lenses and to thereby obtain more efficient illumination by increasing the number of images.

Figure 2:
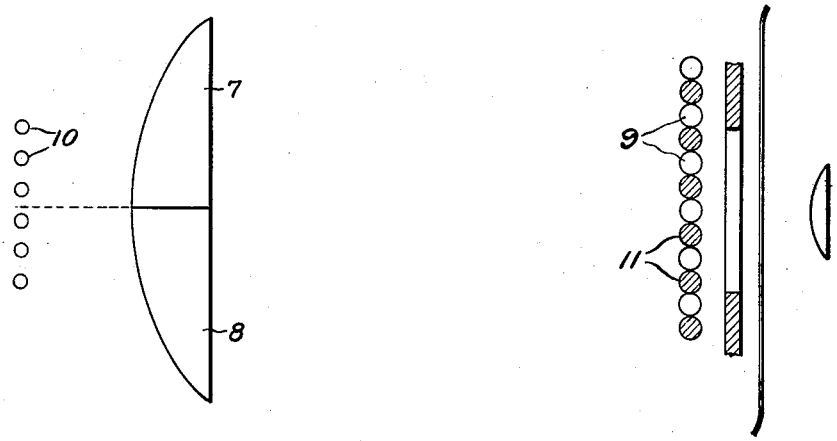
Figure 3:
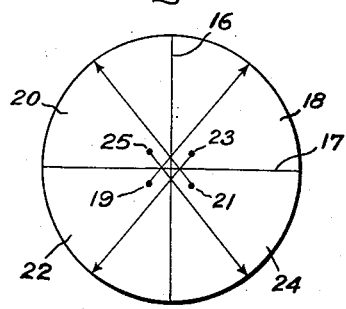
Figure 4:
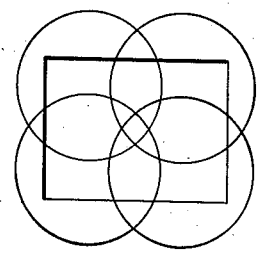
Figure 5:
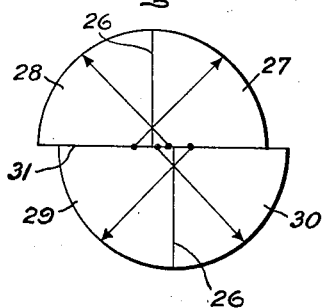
Figure 6:
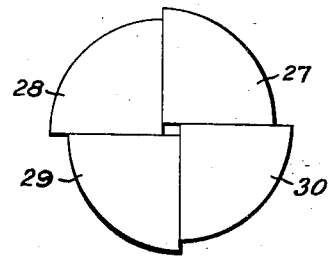

The various details of my invention tending to increase the efficiency and serviceability of devices of the above character are hereinafter more fully set forth and claimed, reference being had to the accompanying drawings. In these drawings Fig. 1 shows the condensing lens of my invention in the optical system of a motion picture machine; Fig. 2 shows the effect when the condensing lens is split into only two portions and when the high intensity Mazda lamp is used. Fig. 3 shows a single lens split into four sections. Fig. 4 shows the effect of splitting the lens as in Fig. 3. Figs. 5 and 6 show how the sections of the split lens may be shifted.

Referring more in detail to the drawings, it will be seen that the optical elements of the motion picture machine comprise the light source 2, the condensing lens 3 for collecting and projecting the light through the aperture of the aperture plate 4 behind which latter the film 4ª is located. After passing the aperture, light impinges upon the projecting lens 5, which focuses the light on the screen 6. To this list may be added the usual sector disc (not shown) used to cut off the light when the film is being moved to the next section, and also the spherical mirror (not shown) which is located behind the source of light. If, in this optical system, the high intensity Mazda lamp is used, in connection with a condenser lens having only two sections 7 and 8, the upper section of the lens 7 will product one set of images 9 of the coils 10 of the Mazda lamp, while the lower section of the lens will produce a second and separate image 11 of the same coils. The reason for this is, as already indicated, that a central portion of the lens has been removed and the two sections 7 and 8 are displaced toward each other with respect to the major optical axis. If, in place of the Mazda coils 10, the high intensity arc, such as the arc 2 in Fig. 1, is substituted, two images of the arc will be produced in place of the images 9 and 11. Although this improves the situation, I find that this arrangement can be further improved by taking a compound condensing lens such as shown in Fig. 1, and consisting of the sections A and B, and removing from each section a central portion along a plane passing through the axis of projection as with the lens shown in Fig. 2. The result is that the lens A is now made up of two sections *a* and *b* and the lens B is similarly made up of two other sections *c* and *d*. With this arrangement, the front lens A produces two images, as explained in connection with Fig. 2, which two images are still further multiplied by the lens B into four images, 12, 13, 14 and 15, just in front of the aperture plate, as indicated in Fig. 1. With this arrangement, the illumination of the screen is split up into four sections or quadrants and approximately in the central portion of each quadrant there will appear the image of the crater of the arc with the result that a much more general uniform illumination results on the screen without the loss which follows when general, uniform illumination is obtained by throwing the image out of focus. The amount of material which is taken away from between the two sections A and B or C and D of the lenses in Fig. 1 is determined by the distance desired between the sections of the images 12, 13, 14 and 15. The distance between the centers of the images 12 and 13 or 14 and 15 is regulated by the amount of material removed from between sections A and B of the lens A, whereas the distance between the images 12 and 13 or 13 and 14 is regulated by the material removed from between the sections C and D of the lens B. Satisfactory results may be obtained for example if four millimeters of material are removed from the vertical slit in the lens A and two millimeters from the horizontal slit in the lens B.

Although I have illustrated only two lenses A and B in Fig. 1, it will be understood that I am not limited to the use of two such lenses or even three. Where two split lenses are used as in Fig. 1, the planes through the split sections are at right angles to each other. As shown in Fig. 1, one of these planes is horizontal, namely, the plane through the split of lens B, whereas the other plane is vertical. I wish to further point out that I do not limit myself to the use of a compound lens as indicated in Fig. 1. A single lens, as indicated in Figs. 2, 3, 5 and 6, may be used. Furthermore, this single lens may be cut into two or four or more sections, a portion of the lens being removed along each cutting plane as described in the foregoing, and as indicated in said Figures 2, 3, 5 and 6. In the event that two cutting planes are used, the cutting planes may be placed at right angles to each other as in Fig. 3. If three cutting planes are used, the planes may be placed 60 degrees with respect to each other. It will be seen therefore that by following any one of the plans suggested, a lens is used comprising more than two lenticular sections, the major axis of each section being displaced with respect to the major axis of the system, the displacement being caused by the removal of a portion of the lens along the cutting plane.

In the event that a single lens, such as shown in Figs. 2, 3, 5 and 6, is used, which is cut into four sections as indicated in Figs. 3, 5 and 6, four images, as indicated in Fig. 4, will be produced if such a lens be substituted for the lens A, B in Fig. 1. The images will, of course, overlap, as indicated in Fig. 4, and in this manner, the undesirable definition which causes variation in illumination is destroyed or greatly obliterated. Inasmuch as the aperture of the motion picture machine is usually wider than it is higher, I cause a displacement of the images sidewise to a greater extent than between the top and bottom, as indicated in Figs. 1 and 4. This is accomplished by removing or adding different amounts of material from the region along the vertical and horizontal cuts, so as to enable the segments of the lens to be drawn closer together or separated further apart.

I also contemplate an arrangement which combines removing material from the cut to displace the segments in one direction and the idea of slipping the segments along the other cut, as indicated in Fig. 5. As indicated in Fig. 6, the segments may be slipped in both directions. By any of these arrangements which I have indicated, the definition of the image at the screen will be destroyed or so modified as to become unobjectionable.

It will be seen, by referring to Fig. 3 and by considering one cutting plane perpendicular to the sheet of the drawing through the cutting line 16 and another cutting plane perpendicular to the sheet of the drawing to the cutting line 17, that the optical axis of the segment 18 is shifted to the position indicated by the point 19. This point is shifted to the left of line 16 as a result of the removal of material from the lens along this line and is at the same time shifted below the line 17 as the result of removal of material from the lens along the line 17. Similarly, the optical center of the segment 20 is shifted to the point 21 and the optical center of the segment 22 to the point 23, while the optical center of the segment 24 is shifted to the point 25. With the arrangement, as indicated in Fig. 5, where material is removed only along the line 26, the centers of the various segments 27, 28, 29 and 30 remain on the line 31. However, by shifting the segments 27, 28, 29 and 30, as indicated in Fig. 6, the optical centers are thrown out of alinement.

It will be seen, therefore, that the invention comprises a lens which is formed with a series of parts taken from a single complete figure of revolution. It will be understood that when the word "series" is used in this connection, three or more are meant.

What I claim as new and desire to secure by Letters Patent of the United States, is:

1. In an optical system, a source of light, a lens located in the path of the rays from the light source and having more than two lenticular sections, the optical axis of each section being displaced with respect to the optical axis of the system, said sections being grouped into two elements to form a compound lens, the sections of each element being each a different portion of the same figure of revolution.

2. In an optical system, a source of light, a lens located in the path of rays from the light source and having more than two lenticular sections, the optical axis of each section being displaced with respect to the optical axis of the system, said sections being grouped into two elements to form a compound lens, the focal points of the sections of each element falling in a common plane, but each focal point falling in a different region of the same plane, the sections of each element being each a different portion of the same figure of revolution.

In witness whereof, I have hereunto set my hand this 23rd day of August, 1923.

FRANK A. BENFORD.